US012338960B1

(12) United States Patent
Wang

(10) Patent No.: US 12,338,960 B1
(45) Date of Patent: Jun. 24, 2025

(54) IC CONTROL LIGHT BULB, LED LIGHT STRIP AND IC CONTROLLER

(71) Applicants: Zhongshan Huwei Hardware Products Co., Ltd., Guangdong (CN); Jiawei Wang, Anhui (CN)

(72) Inventor: Jiawei Wang, Anhui (CN)

(73) Assignees: Jiawei Wang, Bengbu (CN); Zhongshan Huwei Hardware Products Co., Ltd., Zhongshan (CN)

( * ) Notice: Subject to any disclaimer, the term of this patent is extended or adjusted under 35 U.S.C. 154(b) by 0 days.

(21) Appl. No.: 19/061,309

(22) Filed: Feb. 24, 2025

(51) Int. Cl.
*F21K 9/238* (2016.01)
*F21K 9/232* (2016.01)
*F21S 4/10* (2016.01)
*F21S 10/06* (2006.01)
*F21V 23/00* (2015.01)
*F21Y 115/10* (2016.01)

(52) U.S. Cl.
CPC .............. *F21K 9/238* (2016.08); *F21K 9/232* (2016.08); *F21S 4/10* (2016.01); *F21S 10/06* (2013.01); *F21V 23/005* (2013.01); *F21Y 2115/10* (2016.08)

(58) Field of Classification Search
CPC .. F21K 9/238; F21K 9/232; F21S 4/10; F21S 10/06; F21V 23/005; F21Y 2115/10
See application file for complete search history.

(56) References Cited

U.S. PATENT DOCUMENTS

2005/0127842 A1* 6/2005 Kuo .................. H05B 41/2853 315/86
2007/0247847 A1* 10/2007 Villard .................... F21V 29/70 362/249.01
2023/0417375 A1* 12/2023 Wu ........................ H05B 45/30
2024/0255110 A1* 8/2024 Miskin .................. H05B 45/48

FOREIGN PATENT DOCUMENTS

CA 2892464 C * 10/2018 ............. G06F 21/35

* cited by examiner

*Primary Examiner* — Evan P Dzierzynski
(74) *Attorney, Agent, or Firm* — Renner, Otto, Boisselle & Sklar, LLP

(57) ABSTRACT

An IC control bulb, an LED light strip and an IC controller are disclosed. The IC control bulb is provided with a transparent shell in which an IC light-emitting control board is provided. The IC light-emitting control board is provided with light-emitting diodes, a bulb control switch, a low-light relay, a low-light positive terminal, a low-light negative terminal, a load terminal, an IC positive terminal and an IC negative terminal. A first end of the bulb control switch is connected to the IC positive terminal, a second end of the bulb control switch is connected to a normally closed contact end of the low-light relay. A common contact end of the low-light relay is connected to the load terminal and the IC negative terminal respectively. Each light-emitting diode is connected between the common contact end of the low-light relay and the IC negative terminal.

10 Claims, 3 Drawing Sheets

IC CONTROL LIGHT BULB, LED LIGHT STRIP AND IC CONTROLLER

TECHNICAL FIELD

The present disclosure relates to the field of light strips, and in particular, to an IC (Integrated Circuit) control bulb, an LED light strip and an IC controller.

BACKGROUND

At present, most Christmas lights use tungsten light strips. The tungsten bulb operates based on the principle of "thermal expansion and contraction" where resistance increases during illumination and heating, causing the lamp to turn off when powered down. After cooling, the resistance decreases. However, tungsten filaments are prone to aging with prolonged use, requiring frequent replacement of the filaments, which is cumbersome, costly, and impractical for long-term applications.

A small portion of Christmas lights use LED light strips. However, existing LED light strips typically require an external controller to manage their on/off states, which complicates their use. Integrating the controller internally within the LED light strips introduces a new issue: low-light presents during the off phase of the flashing cycle, thereby diminishing the flashing effect.

SUMMARY

An objective of the present disclosure is to solve at least one of the technical problems in the existing technology by providing an IC control bulb, an LED light strip and an IC controller. By integrating the controller with a low-light relay in the bulb with LED light strip, the present disclosure can prevent low light from presenting during the off phase of the flashing cycle, enhance the flashing effect, and improve portability and usability of the LED light strip.

In order to achieve the above objective, in a first aspect, according to an embodiment of the present disclosure, an IC control bulb is proposed, including:

a transparent shell in which an IC light-emitting control board is provided, where the IC light-emitting control board is provided with a plurality of light-emitting diodes, a bulb control switch, a low-light relay, a low-light positive terminal, a low-light negative terminal, a load terminal, an IC positive terminal and an IC negative terminal;

a first end of the bulb control switch is connected to the IC positive terminal, a second end of the bulb control switch is connected to a normally closed contact end of the low-light relay, a common contact end of the low-light relay is connected to the load terminal and the IC negative terminal respectively, each of the light-emitting diodes is connected between the common contact end of the low-light relay and the IC negative terminal, and a coil end of the low-light relay is connected to the low-light positive terminal and the low-light negative terminal respectively; and where the bulb control switch is configured to control conduction between the IC positive terminal and the load terminal and between the IC positive terminal and the IC negative terminal respectively, and the low-light relay is configured to interrupt electromagnetic induction between the IC positive terminal and the load terminal and between the IC positive terminal and the IC negative terminal respectively in case that the bulb control switch is disconnected.

In some embodiments, the IC control bulb further includes a cylindrical base, where an interior of the cylindrical base is a hollow cavity, the transparent shell is arranged inside the cylindrical base from an upper opening of the cylindrical base, a lower opening of the cylindrical base corresponds to the low-light positive terminal, the low-light negative terminal, the load terminal, the IC positive terminal and the IC negative terminal respectively, and an area of the lower opening of the cylindrical base is smaller than an area of the upper opening of the cylindrical base.

In some embodiments, the IC control bulb further includes a bulb protective sleeve, where an interior of the bulb protective sleeve is a hollow cavity, the cylindrical base is arranged inside the bulb protective sleeve from an upper opening of the bulb protective sleeve, and a lower opening of the bulb protective sleeve is arranged opposite to the lower opening of the cylindrical base.

In some embodiments, a side of the cylindrical base is provided with a base hanging lug, a side of the bulb protective sleeve is provided with a hanging lug latching part, the hanging lug latching part is arranged opposite to the base hanging lug, the base hanging lug is configured as an installation part or a disassembly part between the cylindrical base and the bulb protective sleeve, and the hanging lug latching part is configured as a limiting part of the base hanging lug.

In some embodiments, the IC control bulb further includes a transparent outer cover, where a lower opening of the transparent outer cover and the upper opening of the bulb protective sleeve are encapsulated with each other, and the transparent outer cover is configured to protect the transparent shell.

In some embodiments, an encapsulation method between the transparent outer cover and the bulb protective sleeve is one of potting encapsulation, injection molding, and sleeve-type encapsulation, and an encapsulation method between the cylindrical base and the transparent shell is one of potting encapsulation, injection molding and sleeve-type encapsulation.

In order to achieve the above purpose, in a second aspect, an embodiment of the present disclosure proposes an LED light strip, including:

a first main line, a second main line, a neutral line, the IC control bulb in the first aspect and an LED bulb;

where the first main line is connected to the IC positive terminal and the IC negative terminal of the IC control bulb respectively, the second main line is connected to the low-light positive terminal and the low-light negative terminal of the IC control bulb respectively, one end of the neutral line is connected to the load terminal of the IC control bulb, the other end of the neutral line is connected to the LED bulb, and the IC control bulb and the LED bulb are connected in series.

In some embodiments, the LED light strip further includes a plug and a socket, where the plug includes a first plug end and a second plug end, the socket includes a first socket end and a second socket end, the first plug end is connected to one end of the first main line, the second plug end is connected to one end of the second main line, the first socket end is connected to the other end of the first main line, and the second socket end is connected to the other end of the second main line; and where the first plug end is configured to connect a live line, the second plug end is configured to connect a neutral line, the first socket end is configured as an interface of the live line, and the second socket end is configured as an interface of the neutral line.

In some embodiments, the LED light strip is configured to operate in one of a jump flashing mode, a breathing flashing mode, a wave flashing mode, a horse racing flashing mode, or a gradient flashing mode.

In order to achieve the above purpose, in a third aspect, an embodiment of the present disclosure proposes an IC controller, including:

a transparent shell in which an IC light-emitting control board is provided, where the IC light-emitting control board is provided with a bulb control switch, a low-light relay, a low-light positive terminal, a low-light negative terminal, a load terminal, an IC positive terminal and an IC negative terminal;

a first end of the bulb control switch is connected to the IC positive terminal, a second end of the bulb control switch is connected to a normally closed contact end of the low-light relay, a common contact end of the low-light relay is connected to the load terminal and the IC negative terminal respectively, and a coil end of the low-light relay is connected to the low-light positive terminal and the low-light negative terminal respectively; and where the bulb control switch is configured to control conduction between the IC positive terminal and the load terminal and between the IC positive terminal and the IC negative terminal respectively, and the low-light relay is configured to interrupt electromagnetic induction between the IC positive terminal and between the IC positive terminal and the load terminal and the IC negative terminal respectively in case that the bulb control switch is disconnected.

The IC control bulb, LED light strip and IC controller according to embodiments of the present disclosure have at least the following beneficial effects. The IC control bulb is provided with a transparent shell, where an IC light-emitting control board is disposed in the transparent shell, and the IC light-emitting control board is provided with a plurality of light-emitting diodes, a bulb control switch, a low-light relay, a low-light positive terminal, a low-light negative terminal, a load terminal, an IC positive terminal and an IC negative terminal. A first end of the bulb control switch is connected to the IC positive terminal, a second end of the bulb control switch is connected to a normally closed contact end of the low-light relay, a common contact end of the low-light relay is connected to the load terminal and the IC negative terminal respectively, each of the light-emitting diodes is connected between the common contact end of the low-light relay and the IC negative terminal, and a coil end of the low-light relay is connected to the low-light positive terminal and the low-light negative terminal respectively. The bulb control switch is configured to control conduction between the IC positive terminal and the load terminal and between the IC positive terminal and the IC negative terminal respectively, and the low-light relay is configured to interrupt electromagnetic induction between the IC positive terminal and the load terminal and between the IC positive terminal and the IC negative terminal respectively in case that the bulb control switch is disconnected. In this way, the controller with the low-light relay can be integrated in the bulb with a LED light strip, preventing low light from presenting during the off phase of the flashing cycle, enhancing the flashing effect, and improving portability and usability of the LED light strip.

Other features and advantages of the present disclosure will be set forth in, and in part will be apparent from, the description that follows. The objectives and other advantages of the present disclosure may be realized and obtained by the structures particularly pointed out in the description and the accompanying drawings.

BRIEF DESCRIPTION OF DRAWINGS

The accompanying drawings are used to provide a further understanding of the technical solutions of the present disclosure, and constitute a part of the description. Together with the embodiments of the present disclosure, they are used to explain the technical solutions of the present disclosure, and do not constitute a limitation to the technical solutions of the present disclosure.

The present disclosure will be further described below in conjunction with the accompanying drawings and embodiments.

REFERENCE NUMERALS

Figure 1:
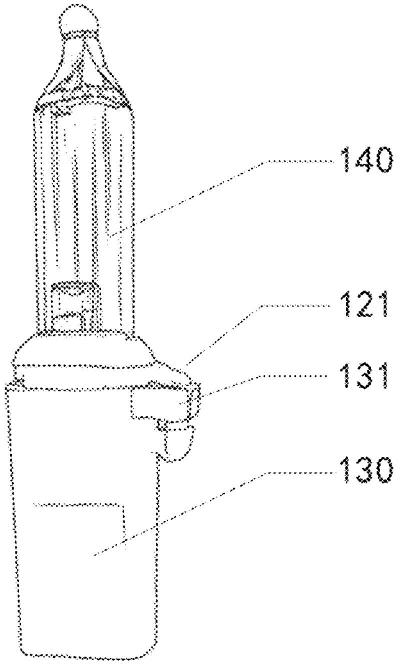
FIG. 1 is an overall structural view of an IC control bulb provided by some embodiments of the present disclosure.

IC control bulb 100, transparent shell 110, IC light-emitting control board 111, light-emitting diode 112, bulb control switch 113, low-light relay 114, low-light positive terminal 115, low-light negative terminal 116, load terminal 117, IC positive terminal 118, IC negative terminal 119, cylindrical base 120, base hanging lug 121, bulb protective sleeve 130, hanging lug latching part 131, transparent outer cover 140;

LED light strip 200, first main line 210, second main line 220, neutral line 230, LED bulb 240, plug 250, first plug end 251, second plug end 252, socket 260, first socket end 261, second socket end 262;

IC controller 300, transparent shell 310, IC light-emitting control board 311, bulb control switch 312, low-light relay 313, low-light positive terminal 314, low-light negative terminal 315, load terminal 316, IC positive terminal 317, IC negative terminal 318.

DETAILED DESCRIPTION

This part will describe the specific embodiments of the present disclosure in detail. The preferred embodiments of the present disclosure are shown in the accompanying drawings. The function of the accompanying drawings is to supplement the description of the written part of the specification with figures, so that people can intuitively and vividly understand each technical feature and the overall technical solution of the present disclosure, but they cannot be understood as limiting the protection scope of the present disclosure.

In the description of the present disclosure, if terms such as “first” and “second” are described, they are only used for the purpose of distinguishing technical features, and cannot be understood as indicating or implying the relative importance or implicitly indicating the number of indicated technical features or implicitly indicating the sequence of technical features indicated. It should be understood that the data so used are interchangeable where appropriate so that the embodiments of the present disclosure described herein can be implemented in a sequence other than those illustrated or described herein. Further, terms such as "include" and "having" and any variations thereof are intended to cover non-exclusive inclusions. For example, a process, method, system, product, apparatus or the like that encompasses a series of steps or units is not necessarily limited to those explicitly listed. Those steps or units may instead include other steps or units not expressly listed or inherent to the process, method, product or apparatus.

In the description of the present disclosure, unless otherwise explicitly limited, words such as setting, installation, and connection should be understood in a broad sense. Those having ordinary skills in the art can reasonably determine the specific meaning of the above words in the present disclosure in combination with the specific content of the technical solution.

At present, most Christmas lights use tungsten light strips. The tungsten bulb operates based on the principle of "thermal expansion and contraction" where resistance increases during illumination and heating, causing the lamp to turn off when powered down. After cooling, the resistance decreases. However, tungsten filaments are prone to aging with prolonged use, requiring frequent replacement of the filaments, which is cumbersome, costly, and impractical for long-term applications.

A small portion of Christmas lights use LED light strips. However, existing LED light strips typically require an external controller to manage their on/off states, which complicates their use. Integrating the controller internally within the LED light strips introduces a new issue: low-light presents during the off phase of the flashing cycle, thereby diminishing the flashing effect.

Based on this, embodiments of the present disclosure provide an IC control bulb, an LED light strip and an IC controller. The IC control bulb is provided with a transparent shell in which an IC light-emitting control board is provided. The IC light-emitting control board is provided with a plurality of light-emitting diodes, a bulb control switch, a low-light relay, a low-light positive terminal, a low-light negative terminal, a load terminal, an IC positive terminal and an IC negative terminal. A first end of the bulb control switch is connected to the IC positive terminal, a second end of the bulb control switch is connected to a normally closed contact end of the low-light relay. A common contact end of the low-light relay is connected to the load terminal and the IC negative terminal, respectively. Each of the light-emitting diodes is connected between the common contact end of the low-light relay and the IC negative terminal, and a coil end of the low-light relay is connected to the low-light positive terminal and the low-light negative terminal, respectively. The bulb control switch is configured to control conduction between the IC positive terminal and the load terminal and between the IC positive terminal and the IC negative terminal, respectively. The low-light relay is configured to interrupt electromagnetic induction between the IC positive terminal and the load terminal and between the IC positive terminal and the IC negative terminal respectively in case that the bulb control switch is disconnected, thus integrating the controller with the low-light relay in the bulb with a LED light strip, preventing low light from presenting during the off phase of the flashing cycle, enhancing the flashing effect, and improving portability and usability of the LED light strip.

Therefore, the embodiments of the present disclosure will be further described below with reference to the accompanying drawings.

Figure 2:
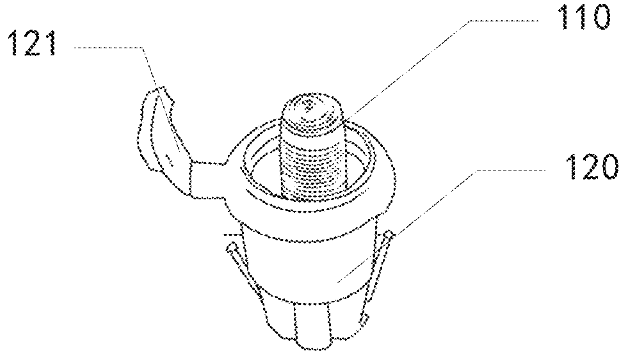
FIG. 2 is a partial structural view of an IC control bulb provided by some embodiments of the present disclosure.
Figure 3:
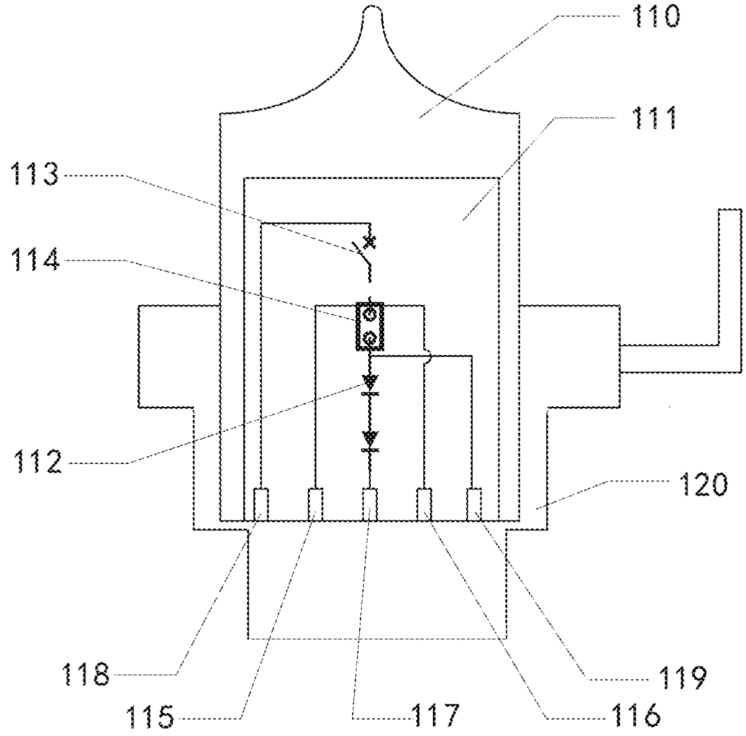
FIG. 3 is a partial structural cross-sectional view of an IC control bulb provided by some embodiments of the present disclosure.
Figure 4:
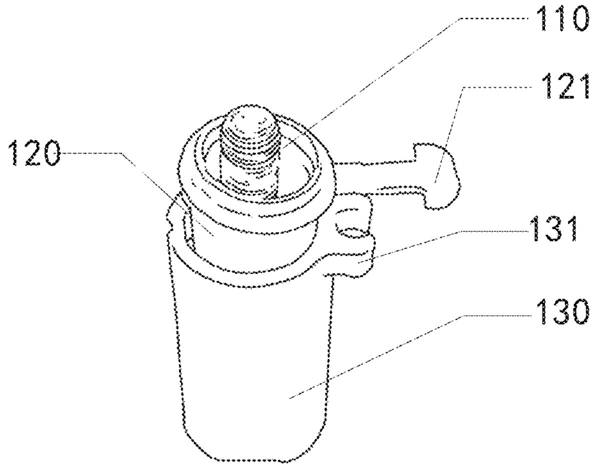
FIG. 4 is an overall structural view of an IC control bulb provided by other embodiments of the present disclosure.

Referring to FIG. 1, FIG. 2, FIG. 3 and FIG. 4, FIG. 1 is an overall structural view of an IC-control bulb provided by some embodiments of the present disclosure, FIG. 2 is a partial structural view of an IC-control bulb provided by some embodiments of the present disclosure, FIG. 3 is a partial structural cross-sectional view of an IC control bulb provided by some embodiments of the present disclosure, and FIG. 4 is an overall structural view of an IC control bulb provided by other embodiments of the present disclosure. The IC control bulb 100 includes a transparent shell 110 in which an IC light-emitting control board 111 is provided. The IC light-emitting control board 111 is provided with a plurality of light-emitting diodes 112, a bulb control switch 113, a low-light relay 114, a low-light positive terminal 115, a low-light negative terminal 116, a load terminal 117, an IC positive terminal 118 and an IC negative terminal 119. A first end of the bulb control switch 113 is connected to the IC positive terminal 118, a second end of the bulb control switch 113 is connected to a normally closed contact end of the low-light relay 114. A common contact end of the low-light relay 114 is connected to the load terminal 117 and the IC negative terminal 119, respectively. Each of the light-emitting diodes 112 is connected between the common contact end of the low-light relay 114 and the IC negative terminal 119, and a coil end of the low-light relay 114 is connected to the low-light positive terminal 115 and the low-light negative terminal 116, respectively.

The bulb control switch 113 is configured to control conduction between the IC positive terminal 118 and the load terminal 117 and between the IC positive terminal 118 and the IC negative terminal 119, respectively, and the low-light relay 114 is configured to interrupt electromagnetic induction between the IC positive terminal 118 and the load terminal 117 and between the IC positive terminal 118 and the IC negative terminal 119 respectively in case that the bulb control switch 113 is disconnected.

The IC control bulb 100 further includes a cylindrical base 120, where an interior of the cylindrical base 120 is a hollow cavity, the transparent shell 110 is arranged inside the cylindrical base 120 from an upper opening of the cylindrical base 120, a lower opening of the cylindrical base 120 corresponds to the low-light positive terminal 115, the low-light negative terminal 116, the load terminal 117, the IC positive terminal 118 and the IC negative terminal 119 respectively, and an area of the lower opening of the cylindrical base 120 is smaller than an area of the upper opening of the cylindrical base 120.

It should be noted that the IC light-emitting control board 111 integrated in the IC control bulb 100 is a microchip. When the bulb control switch 113 cuts off connection between the IC positive terminal 118 and the load terminal 117, and cuts off connection between the IC positive terminal 118 and the IC negative terminal 119, there is still remaining electricity for the live line connected to the IC positive terminal 118. Through electromagnetic induction, the remaining electricity will maintain a short connection between the IC positive terminal 118 and the load terminal 117, and between the IC positive terminal 118 and the IC negative terminal 119, thereby causing the load on the load terminal 117 and each light-emitting diode 112 to remain running at a low power, that is, the light-emitting diode 112 emits low light for a short period of time.

Therefore, in the embodiments of the present disclosure, the low-light relay 114 is disposed, and the corresponding remaining electricity on the neutral line is absorbed through the low-light positive terminal 115 and the low-light negative terminal 116, and then the low-light relay 114 uses the corresponding remaining electricity on the neutral line to control disconnection of the normally closed contact end of the low-light relay 114, completely cutting off the connection between the C positive terminal and the load terminal 117, and the connection between the IC positive terminal 118 and the IC negative terminal 119, and thus preventing occurrence of low light during the off phase of the flashing cycle.

The IC control bulb 100 further includes a bulb protective sleeve 130, where an interior of the bulb protective sleeve 130 is a hollow cavity, the cylindrical base 120 is arranged inside the bulb protective sleeve 130 from an upper opening of the bulb protective sleeve 130, and a lower opening of the bulb protective sleeve 130 is arranged opposite to the lower opening of the cylindrical base 120.

It is worth noting that a side of the cylindrical base 120 is provided with a base hanging lug 121, a side of the bulb protective sleeve 130 is provided with a hanging lug latching part 131, the hanging lug latching part 131 is arranged opposite to the base hanging lug 121, the base hanging lug 121 is configured as an installation part or a disassembly part between the cylindrical base 120 and the bulb protective sleeve 130, and the hanging lug latching part 131 is configured as a limiting part of the base hanging lug 121.

The IC control bulb 100 further includes a transparent outer cover 140, where a lower opening of the transparent outer cover 140 and the upper opening of the bulb protective sleeve 130 are encapsulated with each other, and the transparent outer cover 140 is configured to protect the transparent shell 110.

It should be noted that an encapsulation method between the transparent outer cover 140 and the bulb protective sleeve 130 is one of potting encapsulation, injection molding, and sleeve-type encapsulation, and an encapsulation method between the cylindrical base 120 and the transparent shell 110 is one of potting encapsulation, injection molding and sleeve-type encapsulation.

Figure 5:
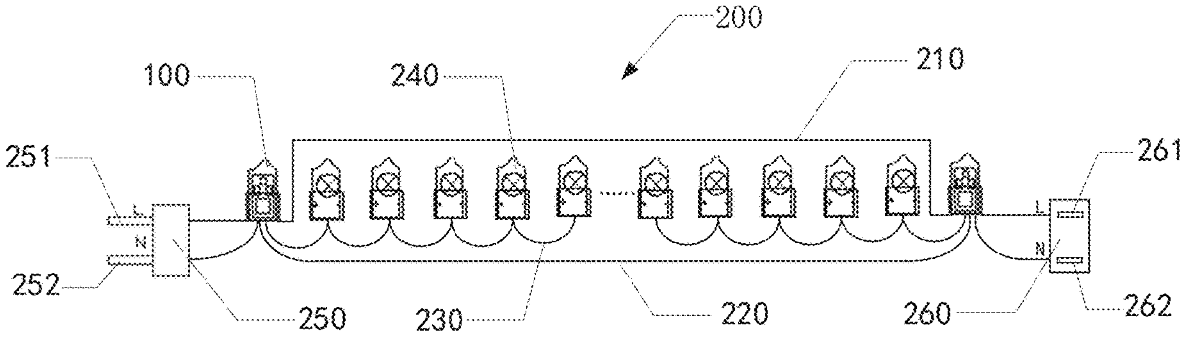
FIG. 5 is a structural view of an LED light strip provided by some embodiments of the present disclosure.

Further, referring to FIG. 5, FIG. 5 is a structural view of an LED light strip provided by some embodiments of the present disclosure. The LED light strip 200 proposed by the embodiments of the present disclosure includes a first main line 210, a second main line 220, and a neutral line 230, the IC control bulb 100 in the above first aspect and an LED bulb 240. The first main line 210 is connected to the IC positive terminal 118 and the IC negative terminal 119 of the IC control bulb 100 respectively. The second main line 220 is connected to the low-light positive terminal 115 and the low-light negative terminal 116 of the IC control bulb 100 respectively. One end of the neutral line 230 is connected to the load terminal 117 of the IC control bulb 100, the other end of the neutral line 230 is connected to the LED bulb 240. The IC control bulb 100 and the LED bulb 240 are connected in series.

It should be noted that the number of IC control bulbs 100 is one or more, and the number of LED bulbs 240 is one or more, which is not specifically limited in the present application.

It should also be noted that by arranging the IC control bulb 100 and the LED bulb 240, the IC control bulb 100 can act as both a controller and a light-emitting part to perform a flashing task together with the LED bulb 240, thereby improving the degree of integration of the LED light strip 200 and the usability and convenience of the LED light strip 200.

The LED light strip 200 further includes a plug 250 and a socket 260. The plug 250 includes a first plug end 251 and a second plug end 252, the socket 260 includes a first socket end 261 and a second socket end 262. The first plug end 251 is connected to one end of the first main line 210, the second plug end 252 is connected to one end of the second main line 220. The first socket end 261 is connected to the other end of the first main line 210, and the second socket end 262 is connected to the other end of the second main line 220.

The first plug end 251 is configured to connect a live line (L line), the second plug end 252 is configured to connect a neutral line (N line), the first socket end 261 is configured as an interface of the live line (L line), and the second socket end 260 is configured as an interface of the neutral line (N line).

In some embodiments, flashing modes of the LED light strip 200 includes a jump flashing mode, a breathing flashing mode, a wave flashing mode, a horse racing flashing mode, or a gradient flashing mode.

Figure 6:
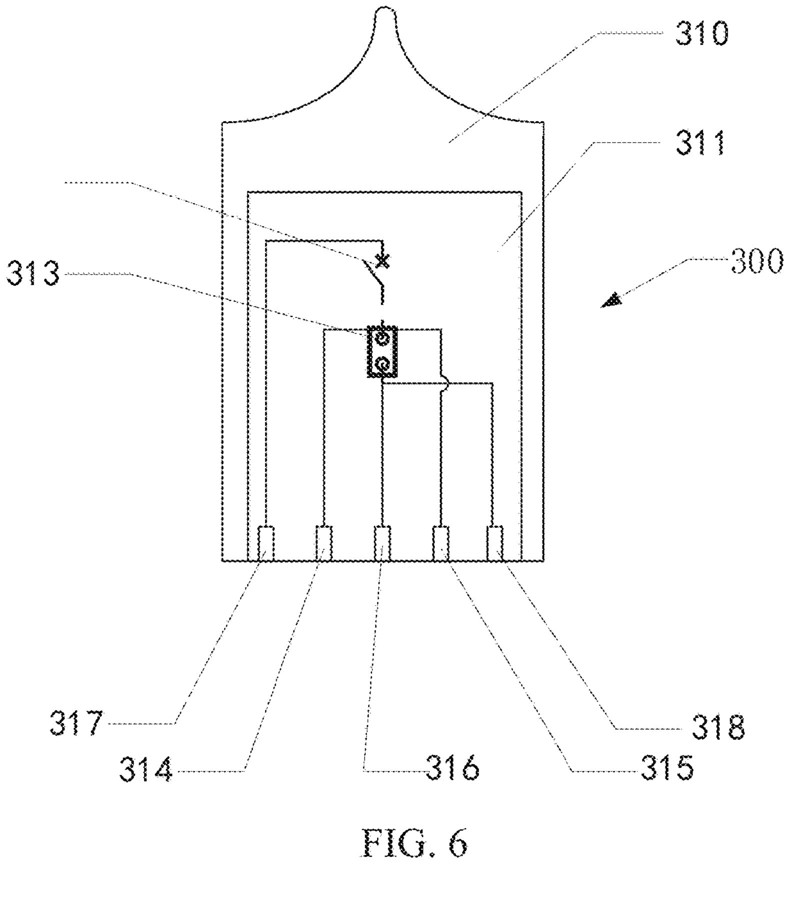
FIG. 6 is an overall structural view of an IC controller provided by some embodiments of the present disclosure.

Referring to FIG. 6, FIG. 6 is an overall structural view of an IC controller provided by some embodiments of the present disclosure. The IC controller 300 proposed by the embodiments of the present disclosure includes a transparent shell 310. An IC light-emitting control board 311 is disposed in the transparent shell 310, and the IC light-emitting control board 311 is provided with a bulb control switch 313, a low-light relay 314, a low-light positive terminal 315, a low-light negative terminal 316, a load terminal 317, an IC positive terminal 318 and an IC negative terminal 319. A first end of the bulb control switch 313 is connected to the IC positive terminal 318, a second end of the bulb control switch 313 is connected to a normally closed contact end of the low-light relay 314. A common contact end of the low-light relay 314 is connected to the load terminal 317 and the IC negative terminal 319 respectively, and a coil end of the low-light relay 314 is connected to the low-light positive terminal 315 and the low-light negative terminal 316, respectively.

The bulb control switch 313 is configured to control conduction between the IC positive terminal 318 and the load terminal 317 and between the IC positive terminal 318 and the IC negative terminal 319 respectively. The low-light relay 314 is configured to interrupt electromagnetic induction between the IC positive terminal 318 and the load terminal 317 and between the IC positive terminal 318 and the IC negative terminal 319 respectively in case that the bulb control switch 313 is disconnected. In this way, the low-light relay 114 is disposed, and the corresponding remaining electricity on the neutral line is absorbed through the low-light positive terminal 115 and the low-light negative terminal 116, and then the low-light relay 114 uses the corresponding remaining electricity on the neutral line to control disconnection of the normally closed contact end of the low-light relay 114, completely cutting off the connection between the IC positive terminal and the load terminal 117 and the connection between the IC positive terminal 118 and the IC negative terminal 119, and thus preventing occurrence of low light during the off phase of the flashing cycle.

It should be understood that in the present disclosure, "at least one" refers to one or more, and "a plurality of" refers to two or more. "And/or" is used to describe the relationship between associated objects, indicating that there can be three relationships. For example, "A and/or B" may indicate three cases: only A, only B, or both A and B, where A and B may be singular or plural. The character "/" generally indicates that the related objects are in an "or" relationship. "At least one of" or similar expressions thereof refers to any combination of the following items, including any combination of a single item (singular) or a plurality of items (plural). For example, at least one of a, b or c may indicate: a, b, c, "a and b", "a and c", "b and c", or "a and b and c", where a, b, c may be single or multiple.

The embodiments of the present disclosure are described in detail above in conjunction with the accompanying drawings. However, the present disclosure is not limited to the above embodiments. Within the scope of knowledge possessed by those of ordinary skill in the art, various changes can be made without departing from the gist of the present disclosure.

What is claimed is:

1. An IC control bulb, comprising:

a transparent shell in which an IC light-emitting control board is provided, wherein the IC light-emitting control board is provided with a plurality of light-emitting diodes, a bulb control switch, a low-light relay, a low-light positive terminal, a low-light negative terminal, a load terminal, an IC positive terminal and an IC negative terminal;

wherein a first end of the bulb control switch is connected to the IC positive terminal, a second end of the bulb control switch is connected to a normally closed contact end of the low-light relay, a common contact end of the low-light relay is connected to the load terminal and the IC negative terminal, respectively, each of the light-emitting diodes is connected between the common contact end of the low-light relay and the IC negative terminal, and a coil end of the low-light relay is connected to the low-light positive terminal and the low-light negative terminal, respectively; and wherein the bulb control switch is configured to control conduction between the IC positive terminal and the load terminal and between the IC positive terminal and the IC negative terminal, respectively, and the low-light relay is configured to interrupt electromagnetic induction between the IC positive terminal and the load terminal and between the IC positive terminal and the IC negative terminal respectively in case that the bulb control switch is disconnected.

2. The IC control bulb according to claim 1, further comprising a cylindrical base, wherein an interior of the cylindrical base is a hollow cavity, the transparent shell is arranged inside the cylindrical base from an upper opening of the cylindrical base, a lower opening of the cylindrical base corresponds to the low-light positive terminal, the low-light negative terminal, the load terminal, the IC positive terminal and the IC negative terminal respectively, and an area of the lower opening of the cylindrical base is smaller than an area of the upper opening of the cylindrical base.

3. The IC control bulb according to claim 2, further comprising a bulb protective sleeve, wherein an interior of the bulb protective sleeve is a hollow cavity, the cylindrical base is arranged inside the bulb protective sleeve from an upper opening of the bulb protective sleeve, and a lower opening of the bulb protective sleeve is arranged opposite to the lower opening of the cylindrical base.

4. The IC control bulb according to claim 3, wherein a side of the cylindrical base is provided with a base hanging lug, a side of the bulb protective sleeve is provided with a hanging lug latching part, the hanging lug latching part is arranged opposite to the base hanging lug, the base hanging lug is configured as an installation part or a disassembly part between the cylindrical base and the bulb protective sleeve, and the hanging lug latching part is configured as a limiting part of the base hanging lug.

5. The IC control bulb according to claim 3, further comprising a transparent outer cover, wherein a lower opening of the transparent outer cover and the upper opening of the bulb protective sleeve are encapsulated with each other, and the transparent outer cover is configured to protect the transparent shell.

6. The IC control bulb according to claim 5, wherein an encapsulation method between the transparent outer cover and the bulb protective sleeve is one of potting encapsulation, injection molding and sleeve-type encapsulation, and an encapsulation method between the cylindrical base and the transparent shell is one of potting encapsulation, injection molding and sleeve-type encapsulation.

7. An LED light strip, comprising:

a first main line, a second main line, a neutral line, the IC control bulb according to claim 1 and an LED bulb;

wherein the first main line is connected to the IC positive terminal and the IC negative terminal of the IC control bulb respectively, the second main line is connected to the low-light positive terminal and the low-light negative terminal of the IC control bulb respectively, one end of the neutral line is connected to the load terminal of the IC control bulb, the other end of the neutral line is connected to the LED bulb, and the IC control bulb and the LED bulb are connected in series.

8. The LED light strip according to claim 7, further comprising a plug and a socket, wherein the plug comprises a first plug end and a second plug end, the socket comprises a first socket end and a second socket end, the first plug end is connected to one end of the first main line, the second plug end is connected to one end of the second main line, the first socket end is connected to the other end of the first main line, and the second socket end is connected to the other end of the second main line; and wherein, the first plug end is configured to connect a live line, the second plug end is configured to connect a neutral line, the first socket end is configured as an interface of the live line, and the second socket end is configured as an interface of the neutral line.

9. The LED light strip according to claim 8, wherein the LED light strip is configured to operate in one of a jump flashing mode, a breathing flashing mode, a wave flashing mode, a horse racing flashing mode, or a gradient flashing mode.

10. An IC controller, comprising:

a transparent shell in which an IC light-emitting control board is provided, wherein the IC light-emitting control board is provided with a bulb control switch, a low-light relay, a low-light positive terminal, a low-light negative terminal, a load terminal, an IC positive terminal and an IC negative terminal;

wherein a first end of the bulb control switch is connected to the IC positive terminal, a second end of the bulb control switch is connected to a normally closed contact end of the low-light relay, a common contact end of the low-light relay is connected to the load terminal and the IC negative terminal respectively, and a coil end of the low-light relay is connected to the low-light positive terminal and the low-light negative terminal respectively; and wherein the bulb control switch is configured to control conduction between the IC positive terminal and the load terminal and between the IC positive terminal and the IC negative terminal, respectively, and the low-light relay is configured to interrupt electromagnetic induction between the IC positive terminal and the load terminal and between the IC positive terminal and the IC negative terminal respectively in case that the bulb control switch is disconnected.

* * * * *